Feb. 2, 1943.                C. C. UTZ                 2,309,812
                         VEHICLE SUSPENSION
                       Filed April 16, 1942
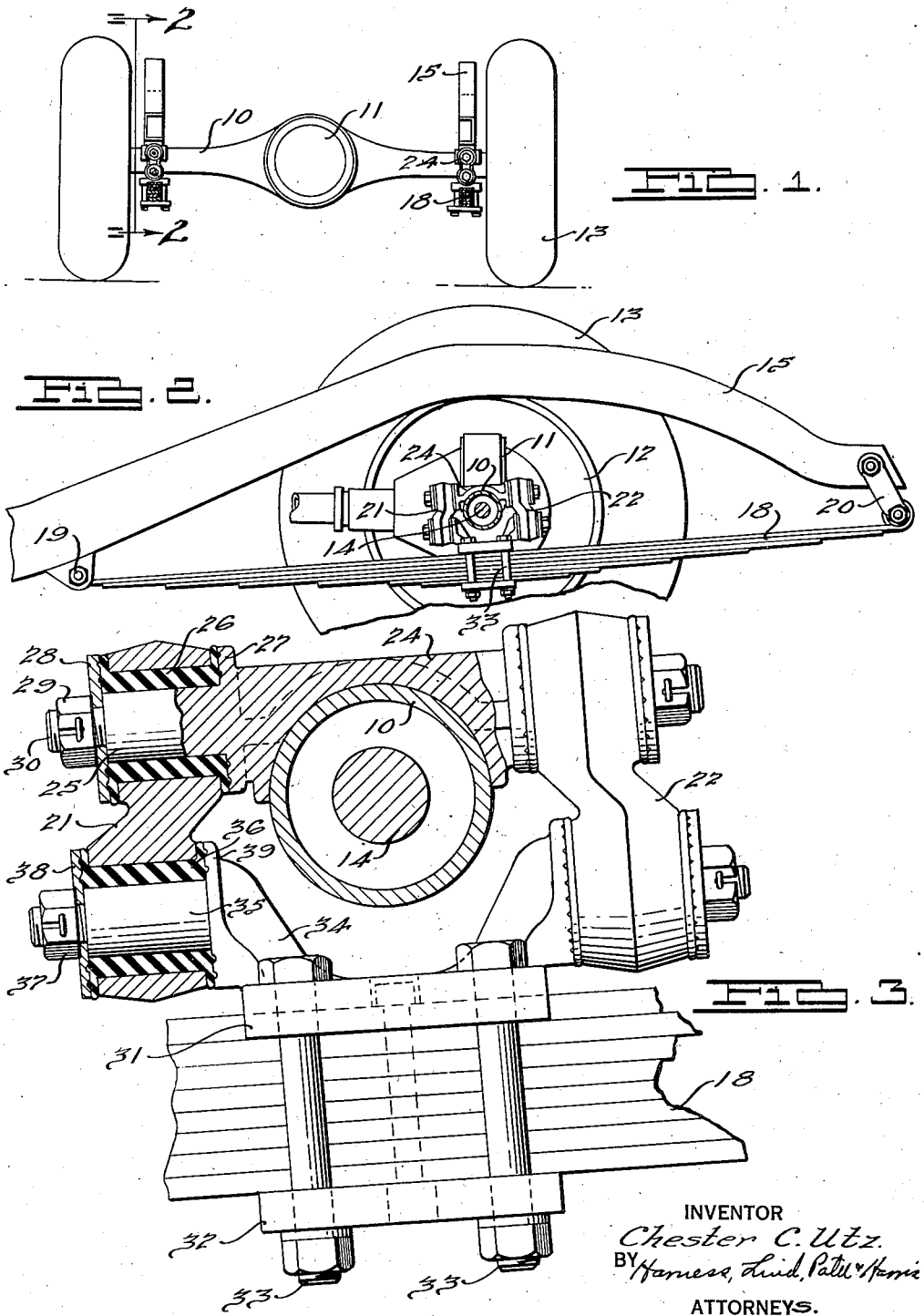
INVENTOR
Chester C. Utz.
BY Harness, Dick, Patten & Harris
ATTORNEYS.

Patented Feb. 2, 1943

2,309,812

UNITED STATES PATENT OFFICE 2,309,812

VEHICLE SUSPENSION

Chester C. Utz, Redford Station, Mich., assignor to Chrysler Corporation, Highland Park, Mich., a corporation of Michigan Application April 16, 1942, Serial No. 439,193

3 Claims. (Cl. 267—52)

This invention relates to vehicle spring suspensions and is an improvement over the suspension disclosed and claimed in Baker Patent No. 2,274,518, issued February 24, 1942.

In the device of the aforesaid Baker patent, the leaf springs which form part of the rear axle suspension of the motor vehicle are attached to the axle by means of shackle members. These shackle members are of U-shape and are pivoted to the underside of the axle and to the underside of the spring on parallel axes which lie in a plane perpendicular to the axle. The axle is thus permitted to oscillate laterally of the vehicle during travel of the vehicle.

While the Baker suspension constitutes a material improvement over the prior art, it is relatively bulky, heavy and requires the use of bumper pads to limit the sidewise movement of the axle.

The present invention secures all of the desirable results of the Baker device, yet is much simpler, easier to manufacture, cheaper, and eliminates the necessity for the U-shaped members and bumper pads.

Another advantage of the present invention resides in the fact that the shackle links are stressed in tension or compression at all times and bending movements are entirely absent.

Other advantages will be apparent from the following description which is directed to a preferred embodiment of the invention.

In the drawing:

Fig. 1 is a rear elevation of a vehicle chassis showing the essential parts of my improved axle suspension.

Fig. 2 is a sectional elevational view taken as indicated by the arrows 2—2 on Fig. 1.

Fig. 3 is an enlarged view of the shackle connecting means between the axle and one of the springs, certain parts being broken away to show sectional details thereof.

The rear drive axle 10 is provided with the usual differential housing 11 and brake structure 12. The drive wheels 13 are mounted on the axle in the usual manner and are driven from the differential gearing by axle shafts 14.

A pair of leaf springs 18 are pivoted to the chassis side sills 15 by pivot bolts 19 and are shackled at their other ends to the sills by the links 20.

The springs are respectively connected to the axle housing at points adjacent the ends of the latter by means of pairs of swing or shackle links 21, 22. These links are preferably of forged construction and are of offset shape, as shown, for compactness.

The axle 10 carries at points adjacent each end, a saddle member 24 which is welded or otherwise securely fixed thereto on top of the housing. This saddle member is formed at each end with pivot portions 25 on which the links 21, 22 are journalled.

A resilient bushing 26 is preferably disposed between the journal portions 25 and the links for permitting a slight degree of universal movement to compensate for possible manufacturing inaccuracies and to eliminate the need for lubrication. This bushing is suitably formed to provide a channel mounting for the journal portion of the link, as illustrated. A shoulder 27 formed on the saddle member positions the link thereon and a washer 28 retained in place by a nut 29 which is received on the reduced threaded portion 30 of the saddle keeps the parts in assembled relation.

The leaves of the spring 18 are retained in assembly by the brackets 31, 32 and bolts 33 which are the equivalent of the conventional U-bolts. The top bracket 31 is formed with a pair of upstanding arms 34 which are in turn formed with substantially horizontally extending journal portions 35.

The lower ends of the links 21, 22 are mounted in these journal portions, a resilient bushing 36 being preferably provided. A nut 37, washer 38 and shoulder 39 form the retaining means as described above.

The links 21, 22 are relatively short and permit a limited amount of movement of the axle laterally of the chassis frame.

It will thus be seen that I have provided an exceedingly simple and compact suspension for vehicles which permits limited swinging of the axle transversely of the vehicle frame thereby effecting an impressive reduction in the "shake" over conventional suspensions. For a theoretical discussion of the question of "shake" and the causes and effects thereof reference should be made to the Baker patent mentioned above.

I claim:

1. In a vehicle spring suspension, a frame; an axle; a pair of leaf springs respectively pivoted to the frame at one end thereof and shackled thereto at the other end thereof; means for connecting the central portions of said springs to said axle at points adjacent the ends thereof for accommodating limited lateral swinging of said axle relatively to said springs comprising a pair of links pivotally connected respectively to said axle and said springs; the axes of said pivotal connections being disposed on opposite sides of said axle and lying in a common vertical plane disposed longitudinally of said frame.

2. In a vehicle spring suspension, a frame; an axle; a pair of leaf springs respectively pivoted to the frame at one end thereof and shackled thereto at the other end thereof; means for connecting the central portions of said springs to said axle at points adjacent the ends thereof comprising saddle members fixed to said axle and having journal portions extending forwardly and rearwardly of the axle in a plane disposed above the axis thereof, members carried by said springs having journal portions extending forwardly and rearwardly of the axle in a plane disposed below the axis thereof, and links connecting the journal portions of said respective members whereby lateral swinging of the axle is accommodated.

3. In a vehicle spring suspension, a frame; an axle; a pair of leaf springs respectively pivoted to the frame at one end thereof and shackled thereto at the other end thereof; means for connecting the central portions of said springs to said axle at points adjacent the ends thereof for accommodating limited lateral swinging of said axle relatively to said springs comprising a pair of links pivotally connected respectively to said axle and said springs; the axes of said respective pivotal connections being disposed above and below said axle.

CHESTER C. UTZ.